Aug. 26, 1952 — F. W. MILLER — 2,608,095
FLAT GLASS INSERT ASSEMBLY
Filed March 6, 1946 — 2 SHEETS—SHEET 1
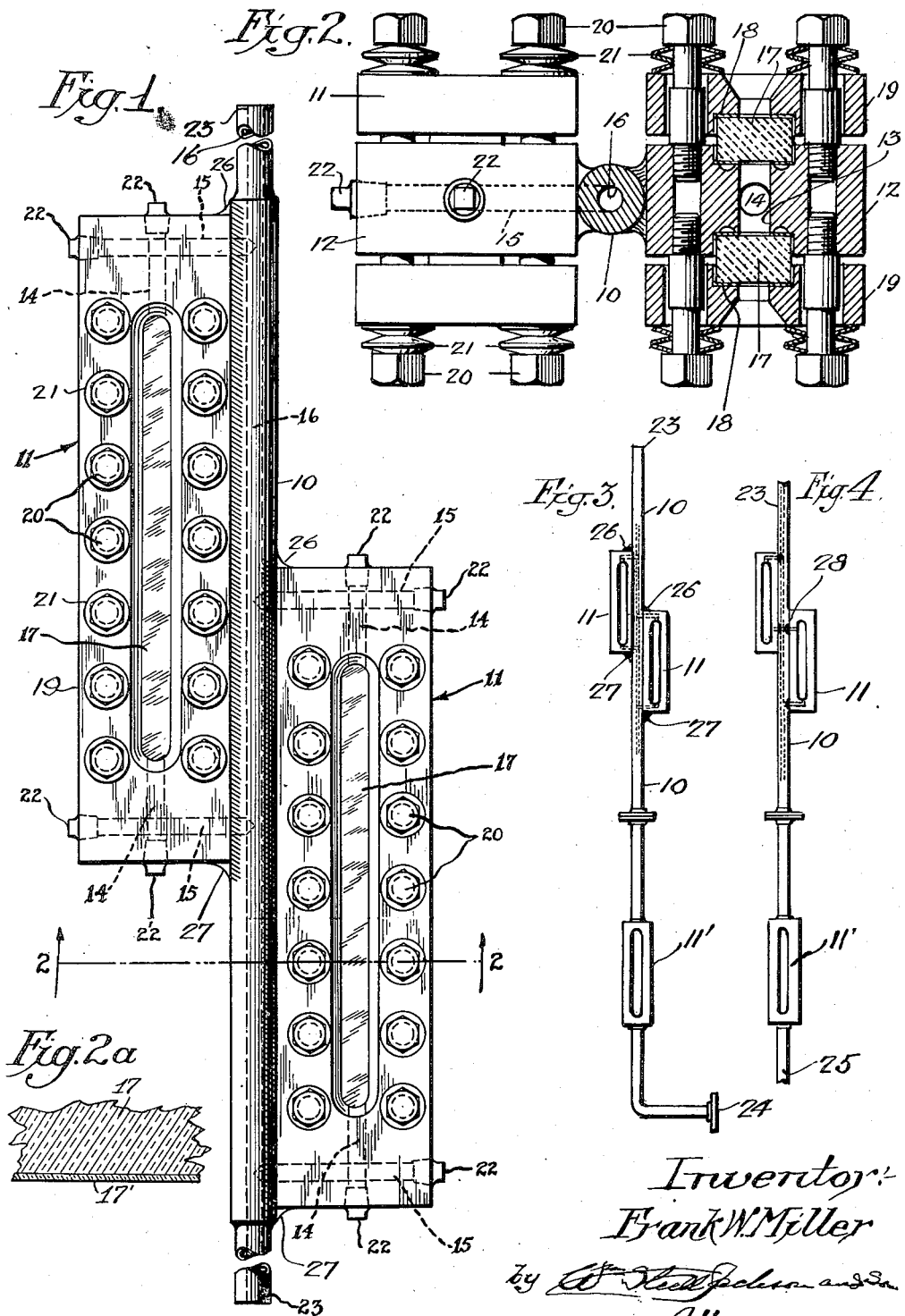
Inventor:
Frank W. Miller
by [signature] Attorneys Aug. 26, 1952 — F. W. MILLER — 2,608,095
FLAT GLASS INSERT ASSEMBLY
Filed March 6, 1946 — 2 SHEETS—SHEET 2
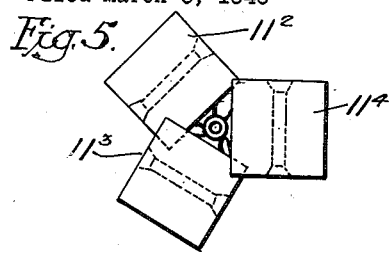
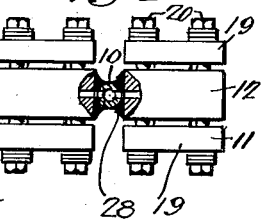
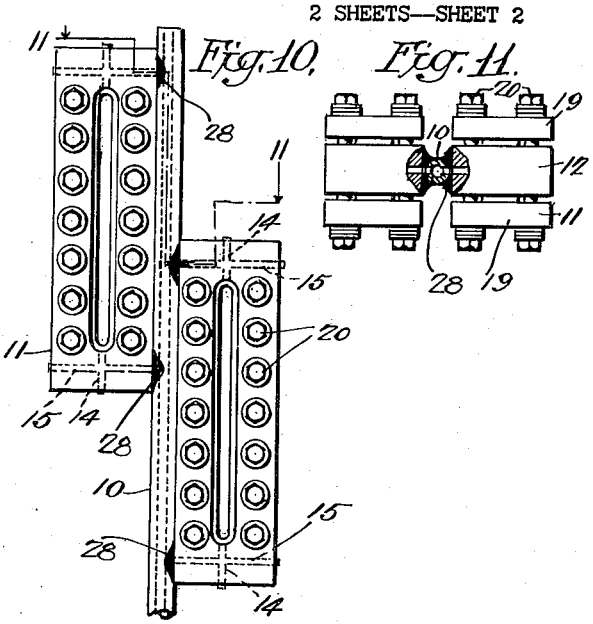
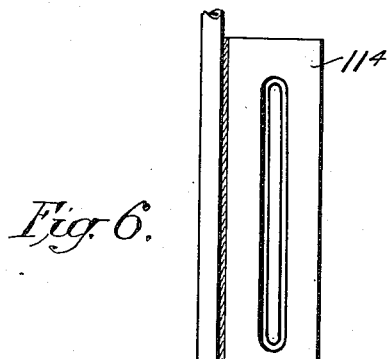
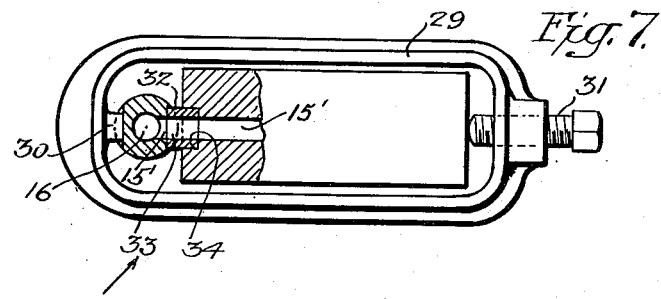
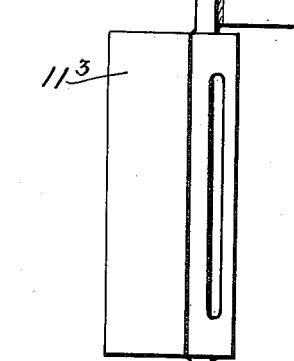
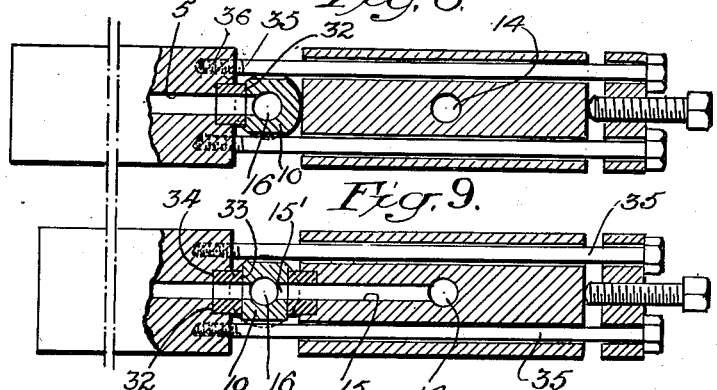
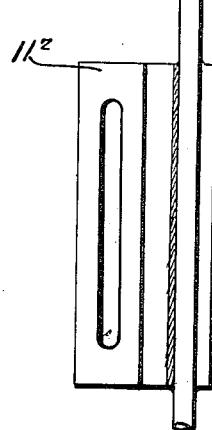
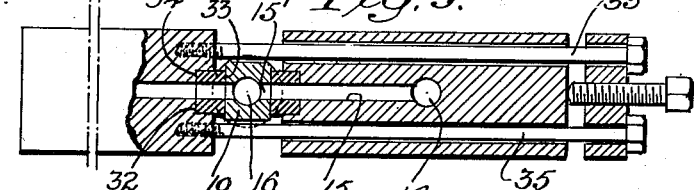
Inventor:—
Frank W. Miller
by Attorneys.

Patented Aug. 26, 1952

2,608,095

UNITED STATES PATENT OFFICE 2,608,095

FLAT GLASS INSERT ASSEMBLY

Frank W. Miller, Philadelphia, Pa., assignor to Yarnall-Waring Company, Chestnut Hill, Philadelphia, Pa., a corporation of Pennsylvania Application March 6, 1946, Serial No. 652,462

7 Claims. (Cl. 73—329)

The main purpose of the invention is to use simple drop forgings and stock sizes of material in making a liquid level gauge which can readily be "tailored" to suit the job.

A further purpose is to use a mount in the form of a connecting tube for overlapping indication by two or more indicators, welding the indicators to the tubing and drilling through to connect both indicators with the tubing at the overlap, thus permitting use of the extended tubing to make indication available at another part of the height of the water or other liquid.

A further purpose is to provide a mount of heavy tubing, having flat glass gage units at the high and low water positions, welded or clamped along the length of the tubing, at the upper and lower unit positions and using the tubing to give side finish to the units.

A further purpose is to reduce the amount of machining in the mounting of flat glass gage assemblies by welding or clamping them upon tubular supports which connect with the water columns, boilers, tanks, heaters, etc., and supply both liquid connection and mechanical support.

A further purpose is to secure flat gage glass frames in overlapping position on opposite sides of a pipe used as a support and as a connection, and to drill between the pipe and glass frames at the upper and lower ends of the gage glass frames, permitting the glasses to be applied at any part of the length of the tubing, covering the desired range of water levels. The weight and cost are greatly reduced by welding at drilled points only.

It will be seen that the use of a central tube as a support of the gages at their edges, not only makes it possible to apply flat gages, in a way to reduce deterioration, but to apply them at any points along the lengths of the central tubes and to use overlapping gages on opposite sides for any range of visibility desired such as an upper range in Figures 3 and 4. In the same equipment where overlapping is not required, I can use single gages with end pieces threaded to the end of the gage body in series with the support at the second range, such as a lower range in these figures. At whatever positions and ranges visibility is desired and choice of overlapping or single flat gages gives complete flexibility to the system, so that the system may be "tailored" to great advantage to the needs of individual installations. The system lends itself to manufacture from drop forgings and standard bar and tube stock.

A further purpose is to reduce the cost of manufacture of high pressure gages.

A further purpose is to stiffen gages, for example those having exceptionally long indicating ranges, by extending a central column of suitable stiffness throughout the length of the gage and attaching gage units laterally to the central column, with or without overlapping.

A further purpose is to provide a liquid level gage assembly comprising a plurality of gage units, all connected in parallel with the liquid column.

A further purpose is to provide a liquid level indicator having a central liquid column which relieves against the deteriorating effects of hot condensate and laterally attached indicating units.

A further purpose is to provide a gage construction which can be cheaply assembled by welding or, where this is objectionable, by clamping, from a supply of standard units in accordance with the range requirements for any given installation and which will quickly accommodate increased gage units at any time.

Further purposes will appear from the specification and drawings, in which:

Figure 1 is a side elevation of a central column liquid level indicator, constructed according to my invention.

Figure 2 is a section to enlarged scale taken along lines 2—2 of Figure 1.

Figure 2$^a$ is an enlarged fragmentary section of the gage glass showing the mica layer on the inside of the gage glass.

Figure 3 is a reduced scale side elevation of an assembly involving the invention.

Figure 4 is a reduced scale side elevation similar to that of Figure 3 but in which the flat glass gage units are welded to tubes at the transverse passages only.

Figure 5 is a top plan view of the structure of Figure 6.

Figure 6 is a side elevation partly in section of the structure of Figure 5.

Figure 7 is a top plan view, partly broken away to show a clamped form.

Figures 8 and 9 are fragmentary staggered sections transverse to the lengths of the tubes showing two different forms of clamps by which indicators may be clamped to the feeding and supporting tubes instead of welding them to the tubes, and omitting the covers and gage glasses.

Figure 10 is a fragmentary side elevation to reduced scale showing welding limited to areas where passages occur.

Figure 11 is a fragmentary transverse section of Figure 10, taken on the line 11—11.

In the drawings similar numerals indicate like parts.

Steam boilers represent a large investment, and are so wholly dependent for their safety and continuous performance upon proper level indication that the water level indicators used and particularly the simple and reliable inserts here provided may be considered as the "eyes" of the boilers, through which the boiler operators can determine the water level.

Liquid level gages are of course well known and the present invention cooperates with the best of the flat gages, the highest development of the gage art. The best flat gage glass construction is illustrated in connection with the present invention. It is found in Yarnall-Waring Patents Nos. 1,992,455, February 26, 1935 and 2,330,102, September 21, 1943.

Simplicity in gage construction is very highly desirable and the present invention aims to simplify and relatively to streamline the gages used and for that purpose, to build up the gages from elemental parts such as bar-stock, drop forgings and standard tubing, the units being held together by welding or clamping.

Since the parts are built up from small units which are articulated to build up a level gage "tailored" to the needs of the intended service, the individual elements may be improved without rebuilding the entire assemblage.

The flow passages are intended to be direct and free from interruption so as to be generally fully fool proofed throughout. Simplicity and economy are thus the controlling factors in the present construction. The construction has great flexibility in that it permits a wide range of adaptability to individual needs.

The pipe or column 10 carries a plurality of indicators 11, in an overlapping relationship in order that there be no blind spots over the desired range. The gage indicator units 11 comprise each a body portion 12, which for the type of high pressure gage illustrated, is a drop forging. Body member 12 has a centrally milled longitudinal slot 13 terminating at each end of the body member in longitudinally drilled holes 14 connecting with the slots. Body member 12 also has transversely drilled holes 15 which intersect holes 14 to provide passages from slot 13 to central bore 16 of column 10. Body member 12 is attached to column 10 preferably by welding before or after holes 15 are drilled.

The passage 16 in the double extra heavy seamless pipe or column 10 of the composite indicator is connected to the boiler above and below the water level and is turned down to a smaller diameter at both ends for connection with suitable fittings.

It will be appreciated that the individual units can be made identical, front and back, end for end, and side for side, thus making the right and left units completely interchangeable and either body capable of attachment at either side of the body to either side of the seamless tube and of reversal, end for end.

Body member 12 carries lateral gage glasses 17 (protected on the inside by mica 17') with suitable packing 18, the flat glasses and packing being securely clamped to position as in normal flat gages, by slotted plates 19 resiliently supported by cap screws 20 and spring washers 21. The details of the construction of the gage units themselves form no part of this invention but are fully described in Patent No. 2,330,102 cited above. It will be appreciated that the design of the individual gage units may also be in accordance with the construction disclosed in Patent No. 1,992,455 cited above or any other standard high pressure preferably flat glass (or other suitable transparent material) indicator well known in the art. After welding and assembly of the units to the central column 10, the openings to passages 14 and 15 are sealed with plugs 22.

In attaching the body forgings 12 to central column 10, provision is made as desired for overlapping of the sight glasses 17 to provide for continuous reading over the desired range or desired ranges. Furthermore, it will be apparent that a number of gage units may be secured to the central column either in overlapping or in spaced relation. By attaching the individual gage units laterally and in multiple with the central column, I am able to achieve several distinct and advantageous results.

The first beneficial result is the simplification and reduction of cost in manufacturing of gage assembly. The individual units can be carried in stock and assembled quickly in accordance with the requirements at hand or the units may be shipped for quick installation on the job either by welding or clamping. Where it is not desired to use the welded construction illustrated in Figure 2, the lateral face of body member 12 can be readily contoured in a milling machine in accordance with the curvature of the central column 10 to which the units are to be applied. In the case of a prefabricated gage assembly, the ends 23 of column 10 will ordinarily be turned to size or threaded for the intended fittings before final installation.

The extremely simple construction of my gage assembly also permits easy cleaning either mechanically or by blowing off. Plugs 22 are readily removable for this purpose, if necessary. However, it wil be noted that my construction permits much longer periods between cleaning than would otherwise be necessary to ensure accurate readings. This advantage is obtained by the use of a central column which has no bends or angles likely to collect sediment. When the central column is blown off, the high velocity of liquid and vapor in bore 16 tends to create low pressures in passages 14 and 15 thus removing any sediment or deposit therein. It will be apparent that this feature greatly simplifies gage maintenance.

Since the fastening, whether by clamping or by welding, is along one edge only, the finish of this edge can be neglected except that it is quite desirable to have the entire exposed metal gage surface plated in chrome to protect against deterioration. The plating can be applied inexpensively and the tube as well as the outer metal surfaces of the flat gages take the plating readily.

Where the ends of the tube are reduced in diameter for expansion connection through stuffing boxes, the chrome coating protects not only against deterioration of exposed exterior surfaces due to their exposure but against corrosion due to caustic or acid condition of boiler water coming into contact with it within the stuffing boxes. Because each of the flat gages extends only part of the length of the tube, duplicating in those sections only where their sight passages overlap, the weight and from this standpoint the cost of manufacture is greatly reduced—in many cases to much less than one-half—and the gages are much more easily handled for manufacture and repairs.

Repair is particularly facilitated in the case of repairs where the part taken out, repaired and replaced is hot at the time of removal or must be handled in places where the workman does not have adequate footing or space for handling the gage. Even where the end pieces must be made of stainless steel, economical manufacture is provided by having the end pieces alone made of this metal and protecting the more nearly standardized parts by chrome plating.

Wherever desired, a continuous range of water levels can be made available as in Figure 1 by overlapping the sight openings of two or more flat gages, of which two only are shown in Figure 1, making it possible to use an insert of this general character where flat glasses are employed at lower pressures to replace the usual glass tube.

The flat glass is regarded as offering greater protection to the apparatus and to the operators than the tubular glass. The presence of the mica-protected flat glass eliminates breaking or deterioration from etching of boiler water on the tube. When welding is employed to hold the assembly, as a unit, no stress relieving of welds is necessary. An appreciable amount of stress relieving may result from normal operation due to high temperature when in service.

The limits of view for a single glass and the extent of overlap are set by the lengths of the sight openings, which at the present time in good practice are slightly more than twelve inches.

The individual frames for the flat glasses preferably are formed as drop forgings, as seen in Figure 1. The individual flat glass indicators in Figure 1 are in parallel with the passage 16 through the tube. Such parallel arrangements of flat glasses may be used along with other parallel flat glass arrangements covering other parts of the length of the entire unit to give overlapping readings at various parts of the length of the entire tube unit or can be combined with flat glass indicators in series with the tube as shown in Figures 3 and 4. In Figure 3 a parallel arrangement such as seen in Figure 1 is shown using flat indicator bodies 11, in parallel with the passage 16 of the tube 10 in the upper part of the figure and a flat glass indicator having body 11' in series with the passage for a shorter lower portion of the scale such as a low water level section and with terminals at 23 and 24 for connection with the boiler.

In Figure 4 the construction is the same as in Figure 3 with two exceptions; terminal 23 and terminal 25 are shown and the welding which extends the entire length of each flat glass indicator from fillet 26 to fillet 27 in Figures 1 and 3 is applied at the spots 28 only in Figures 4, 10 and 11 to seal the spaces about transverse passages 15 and the corresponding openings into the tube only, reducing the cost and weight. The welding must completely seal the space about the passage 15.

In Figures 5 and 6 a construction is shown in which three gage glasses are connected. Each one is in parallel with the pipe or tube. They are turned at different angles with respect to any vertical plane through the axis of the pipe. In this case they are not overlapping. With slight adjustment of the angles to prevent interference they can of course be permitted to overlap. The view is presented in order to indicate that flat gage glasses can be attached at variant angles with respect to a vertical plane in order to accommodate inspection from any of different angular positions about the vertical pipe axis, permitting the angle as well as other features to be "tailored" to suit the special needs of individual users.

The flat glass frames (bodies) 112, 113, 114 may present normal water level to an observer at one position angularly about the tube, an unusual or dangerous water level to a second observer, in a different angular position calling for, let us say, emergency action and still a third water level, such as, for example, a low water level limit to an observer in a third position. Though these figures have been used to illustrate continuous welding along the length of the edge of the frame and the immediately adjacent tube surface, obviously the welding could be limited to spots 28 reliably surrounding the passages 15 as in Figure 10.

In Figure 7, one form of clamp construction is shown, wherein a yoke 29 surrounds the pipe at a point at which it is drilled to form a passage 15' connecting with the tube bore 16 at one end and a longitudinal gage passage 14 at the other end.

The clamp 29 surrounds the flat gage glass unit as a yoke, having bearing at 30 against the back of the flattened tube at one end of the clamp space and tightened by a set screw 31 at the opposite end. In order that the unit may be sealed properly, the passage connection between the flat gage unit passage and the tube passage is sealed by a thimble or sleeve 32 fitting within recesses 33 and 34 at opposite ends of the thimble.

In Figures 8 and 9 fragmentary sections are shown to illustrate a clamp which is built up by bolts 35 which pass through the breadth—flatwise—of one flat glass gage body and screw into threaded openings 36 of a second flat glass gage which is immediately opposite.

The bolts straddle the tube and provide connection by thimble 32 within recesses in the edge wall of the flat glass frame and in the tube for a single connection 15 in Figure 8 and for opposite connections with registering passages 15 in the two flat glass gages in Figure 9.

It will be evident that the construction described is extremely flexible, light and inexpensive and not only affords excellent permanent construction by welding but permits clamp accommodation of structures to the same needs where welding is undesirable for whatever reason.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A liquid level gage assembly, comprising an integral central tubular metallic column, a pair of separate rectangular gage units having indicating portions which respectively overlap and having integral metallic bodies whole lengths are disposed vertically, each body along one side abutting against the column throughout the length of the body, and each body being rigidly attached to the column, the indicating portions being laterally disposed with respect to the column and the column extending continuously above and below the gage unit, there being a transverse passage at the top and bottom of each gage body extending through the gage body and into the interior of the column connecting the indicating portions to the central column in parallel.

2. A liquid level gage assembly according to claim 26 comprising sleeves in line with the passages and forming parts thereof, sealing between the column and the body at each passage and clamps forcing the column and the body together against the sleeves.

3. A liquid level gage assembly according to claim 26, comprising sleeves in line with the passages and forming parts thereof, sealing between the column and the body at each passage and clamps surrounding the column and the body and forcing the column and the body together against the sleeves.

4. A liquid level gage assembly according to claim 26 comprising sleeves in line with the passages and forming parts thereof, sealing between the column and the body at each passage and fastenings extending transversely through one gage unit and into the other so as to tighten the sleeves in the positions between the columns and the body.

5. A liquid level gage assembly, comprising an integral vertically disposed tubular metallic column, a rectangular gage unit having an indicating portion and an integral metallic body whose length is disposed vertically, the body having one side separate from but abutting against the column throughout the length of the body, and the body being rigidly attached to the column, the indicating portion being laterally disposed with respect to the column and the column extending continuously above and below the gage unit, there being transverse passages extending through the gage body and into the interior of the column at the top and the bottom of each gage, providing connection between said indicating portions and said separate column in parallel.

6. A liquid level gage assembly, comprising an integral central tubular metallic column, a pair of separate rectangular gage units which respectively overlap and having integral metallic bodies whose lengths are disposed vertically, each body along one side abutting against the column throughout the length of the body, welds rigidly uniting each body to the side of the column, the indicating portions being laterally disposed with respect to the column and the column extending continuously above and below the gage units, there being transverse passages in said gage bodies at the tops and bottoms thereof extending through to the interior of the column and providing connection between the indicating portions and the central column in parallel.

7. A liquid level gage assembly, comprising an integral central tubular metallic column, a pair of separate rectangular gage units having portions which respectively overlap and having integral metallic bodies whose lengths are disposed vertically, each body along one side abutting against the column throughout the length of the body, weld metal uniting together the bodies and the columns at the top and bottom of each body, the indicating portions being laterally disposed with respect to the column and the column extending continuously above and below the gage units, there being transverse passages in the gage bodies extending through the weld metal and sealed around the passages by the weld metal and extending into the interior of the column, connecting the indicating portions to the central column in parallel.

FRANK WM. MILLER.

REFERENCES CITED

The following references are of record in the file of this patent:

UNITED STATES PATENTS

| Number | Name | Date |
|---|---|---|
| 967,634 | Goodwin | Aug. 16, 1910 |
| 994,333 | Orth | June 6, 1911 |
| 1,947,910 | Jerguson | Feb. 20, 1934 |
| 1,954,466 | Aicher | Apr. 10, 1934 |
| 2,049,068 | Loupe | July 28, 1936 |
| 2,363,780 | Ernst | Nov. 28, 1944 |
| 2,397,084 | Bernhardt | Mar. 26, 1946 |